United States Patent
Chang et al.

(10) Patent No.: US 12,119,680 B2
(45) Date of Patent: Oct. 15, 2024

(54) CHARGING APPARATUS HAVING BACKUP FUNCTION

(71) Applicant: VINPOWER INC., Alhambra, CA (US)

(72) Inventors: Calvinson Chang, Alhambra, CA (US); Stanley Chu, Alhambra, CA (US); Chihhan Chou, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 453 days.

(21) Appl. No.: 17/352,736

(22) Filed: Jun. 21, 2021

(65) Prior Publication Data

US 2022/0407321 A1    Dec. 22, 2022

(51) Int. Cl.
*H02J 7/04*    (2006.01)
*G06F 11/14*   (2006.01)
*H02J 7/00*    (2006.01)

(52) U.S. Cl.
CPC ...... *H02J 7/00045* (2020.01); *G06F 11/1448* (2013.01); *G06F 11/1456* (2013.01); *H02J 7/00034* (2020.01); *G06F 2211/002* (2013.01); *H02J 2207/30* (2020.01); *H02J 2310/22* (2020.01)

(58) Field of Classification Search
None
See application file for complete search history.

(56) References Cited

U.S. PATENT DOCUMENTS

| | | | |
|---|---|---|---|
| 2002/0169915 A1* | 11/2002 | Wu | G06F 13/4081 710/305 |
| 2005/0253554 A1* | 11/2005 | DiFazio | H02J 7/00 320/114 |
| 2007/0220315 A1* | 9/2007 | Wu | G06F 11/1456 714/E11.12 |
| 2016/0224064 A1* | 8/2016 | Fleisig | G06F 1/266 |
| 2019/0182374 A1 | 6/2019 | Park et al. | |

FOREIGN PATENT DOCUMENTS

| | | |
|---|---|---|
| CN | 101827174 A | 9/2010 |
| JP | 2007249305 A5 | 2/2009 |
| TW | 201404002 A | 1/2014 |
| TW | 201921796 A | 6/2019 |

OTHER PUBLICATIONS

Communication From Foreign Patent Office Regarding a Foreign Counterpart Application 110122632.

* cited by examiner

*Primary Examiner* — Arun C Williams
(74) *Attorney, Agent, or Firm* — Rosenberg, Klein & Lee

(57) ABSTRACT

A charging apparatus having a backup function includes a first connecting interface, a second connecting interface, a processing unit, a memory unit, and an authorizing unit. The first connecting interface is adapted to receive a power source. When the processing unit authorizes the first electronic device, the processing unit activates the backup function to back up data stored on a first electronic device connected to the second connecting interface into the memory unit. Hence, a user can use the charging apparatus to charge the first electronic device, and to back up the data stored on the first electronic device into the memory unit or to restore the data stored on the memory unit into the first electronic. The user of the first electronic device can effortlessly enjoy the data backup and restore functionality.

18 Claims, 8 Drawing Sheets

CHARGING APPARATUS HAVING BACKUP FUNCTION

BACKGROUND OF THE INVENTION

1. Field of the Invention

The present invention relates to a charging apparatus, and more particularly to a charging apparatus having a backup function.

2. Description of the Related Art

Mobile phones or tablets, collectively "Mobile Devices", have become an indispensable part of modern life. Statistically, the amount of data stored on mobile devices is increasing day by day. Therefore, backing up data stored on mobile devices has become a routine chore that mobile device users must face. There are currently many ways to back up the data stored on mobile devices, such as backing up the data to an external device or personal computer via a mobile device cable, or backing up data to a cloud storage space, etc. However, even with the multitudes of currently available backup methods, most mobile device users still tend to neglect the act of backing up the data stored on their mobile devices. This failure to back up the data on their mobile devices leads to many mobile device users occasionally losing part or all of the data stored on their mobile devices which could occur due to various reasons.

Why do so many mobile device users tend to neglect backing up the data stored on their mobile devices? Possible explanations are that the mobile device users are not familiar with or do not know how to perform the data backup operations. Even for those users that do know how to perform data backup, they are burdened by the operations of performing a data backup to such a degree that they cannot diligently perform data backups on a regular basis.

Hence, there are urgent needs to automate the data backup process for mobile devices so that ordinary users of mobile devices can effortlessly utilize the data backup functionality.

SUMMARY OF THE INVENTION

In view of the above-mentioned needs, the main purpose of the present invention is to provide a charging apparatus having a backup function to automatically back up files or restore files while charging a mobile device.

The charging apparatus having the backup function includes a first connecting interface, a second connecting interface, a processing unit, and a memory unit.

The first connecting interface is adapted to receive a power source. The second connecting interface is electrically connected to the first connecting interface for transmitting the power source.

The processing unit is electrically connected to the second connecting interface. The memory unit is electrically connected to the processing unit.

The processing unit determines whether the second connecting interface is connected to a first electronic device. When the second connecting interface is connected to the first electronic device, the processing unit activates the backup function to back up data stored on the first electronic device into the memory unit.

Hence, when a user of the first electronic device uses the charging apparatus of the present invention to charge the first electronic device, the data stored on the first electronic device can be backed up into the memory unit or be restored from the memory unit of the charging apparatus. Namely, the data stored on the first electronic device can be automatically backed up into the memory unit or can be automatically restored up from the memory unit of the charging apparatus when the first electronic device is charging, so that the user of the first electronic device can effortlessly enjoy the data backup and the data restore functionality.

DETAILED DESCRIPTION OF THE INVENTION

Figure 1:
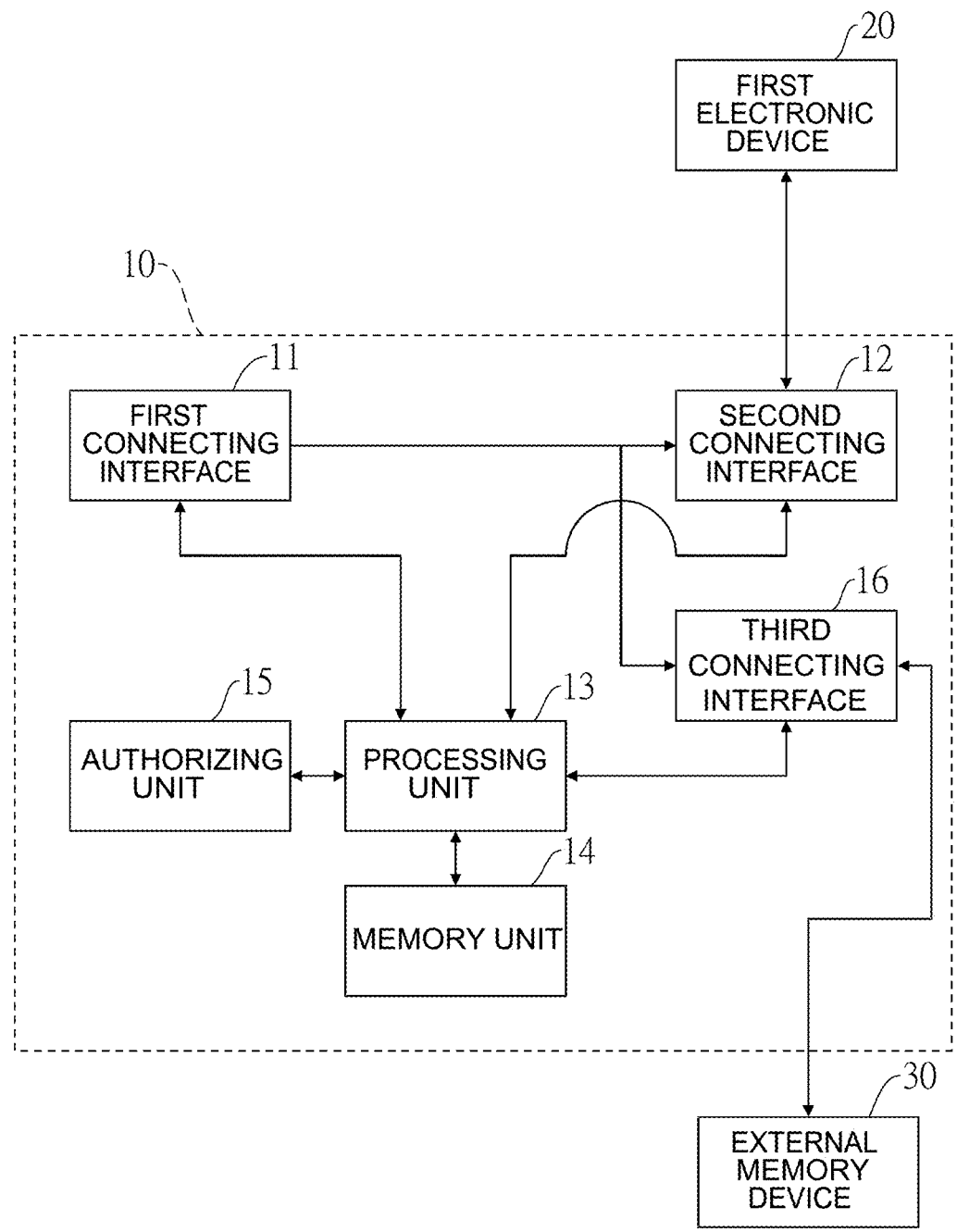
FIG. 1 is a block diagram of an embodiment of a charging apparatus having a backup function of the present invention.

With reference to FIG. 1, the present invention relates to a charging apparatus 10 having a backup function.

The charging apparatus 10 includes a first connecting interface 11, a second connecting interface 12, a processing unit 13, a memory unit 14, and an authorizing unit 15.

The first connecting interface 11 is adapted to receive a power source. For example, the first connecting interface 11 can connect to an adaptor of a first electronic device 20 to receive the power source, or the first connecting interface 11 can directly connect to a main socket to receive the power source. Further, the first electronic device 20 may be a smart phone, a tablet, or a laptop.

The second connecting interface 12 is electrically connected to the first connecting interface 11 for transmitting the power source.

The processing unit 13 is electrically connected to the second connecting interface 12. The memory unit 14 is electrically connected to the processing unit 13. The authorizing unit 15 is electrically connected to the processing unit 13.

The processing unit 13 determines whether the second connecting interface 12 is connected to the first electronic device 20. When the second connecting interface 12 is connected to the first electronic device 20, the processing unit 13 will perform an authentication, if necessary, using the authorizing unit 15 to determine whether the first electronic device 20 is authorized.

When the first electronic device 20 is authorized, the processing unit 13 activates the backup function to back up data stored on the first electronic device 20 into the memory unit 14.

Hence, when a user of the first electronic device 20 uses the charging apparatus 10 for charging, the data stored on the first electronic device 20 can be backed up into the memory unit 14 or restored from the memory unit 14. Namely, the user can simultaneously charge the first electronic device 20 and back up the data stored on the first electronic device 20 or restore the data from the memory unit 14 into the first electronic device 20. Then, the data stored on the first electronic device 20 can be automatically backed up into the memory unit 14 or be restored from the memory unit 14 of the charging apparatus 10 when the first electronic device 20 is charging, so that the user of the first electronic device 20 can effortlessly enjoy the data backup and data restore functionality.

Figure 2A:
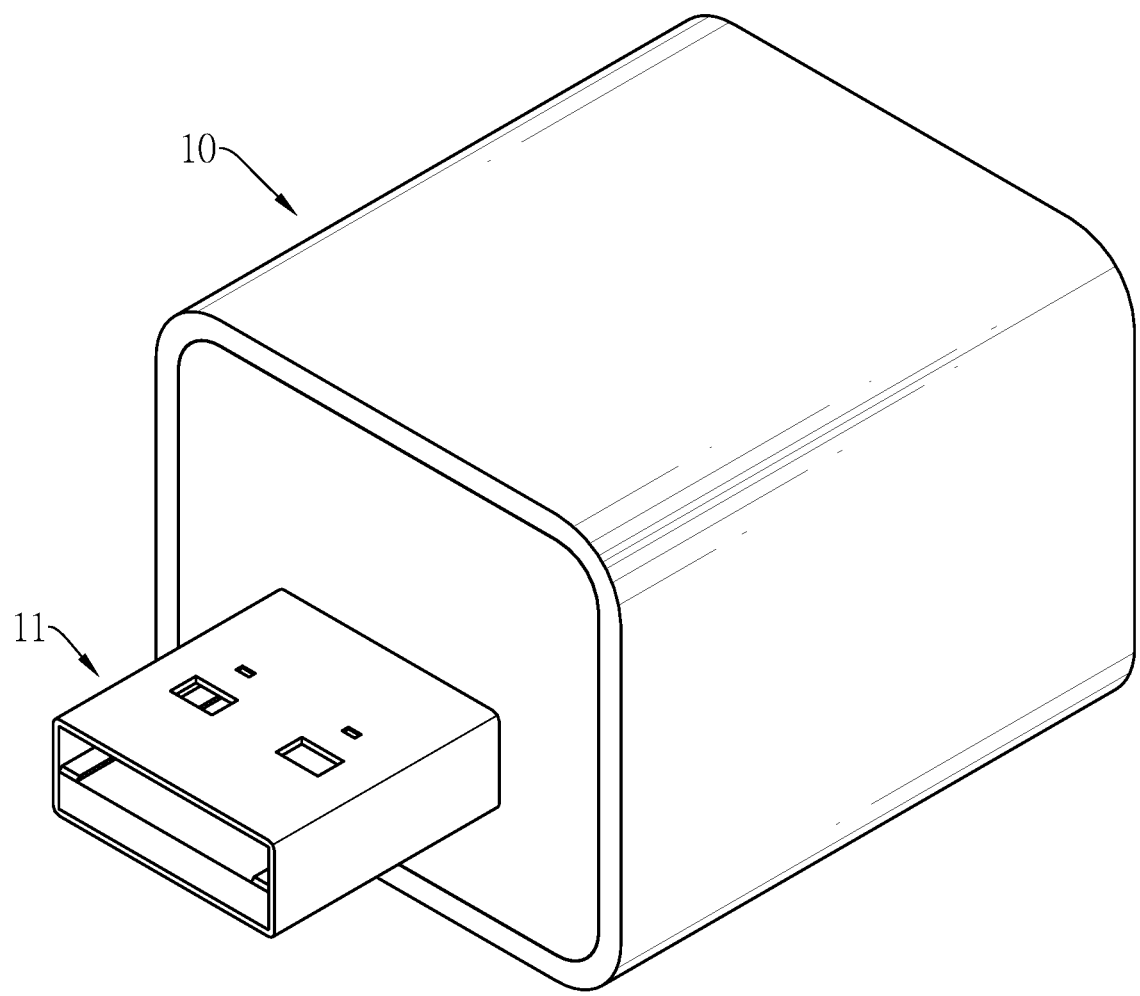
FIGS. 2A and 2B are schematic diagrams of the charging apparatus of the present invention.
Figure 2B:
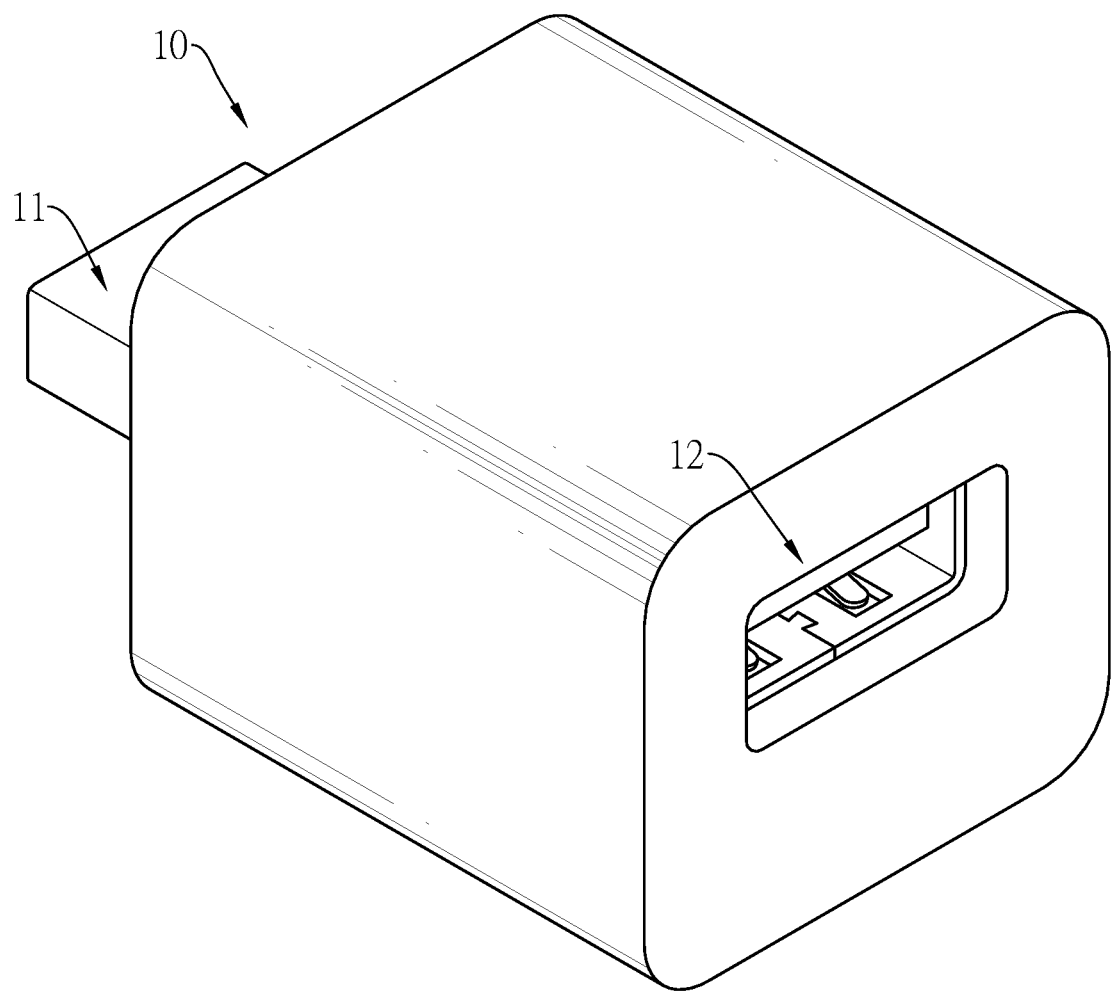

With reference to FIGS. 2A and 2B, in a first embodiment, the first connecting interface 11 may be a male connector such as a male USB Type-A connector, a male USB Type-C connector, or a male lightning connector, etc.

Figure 3:
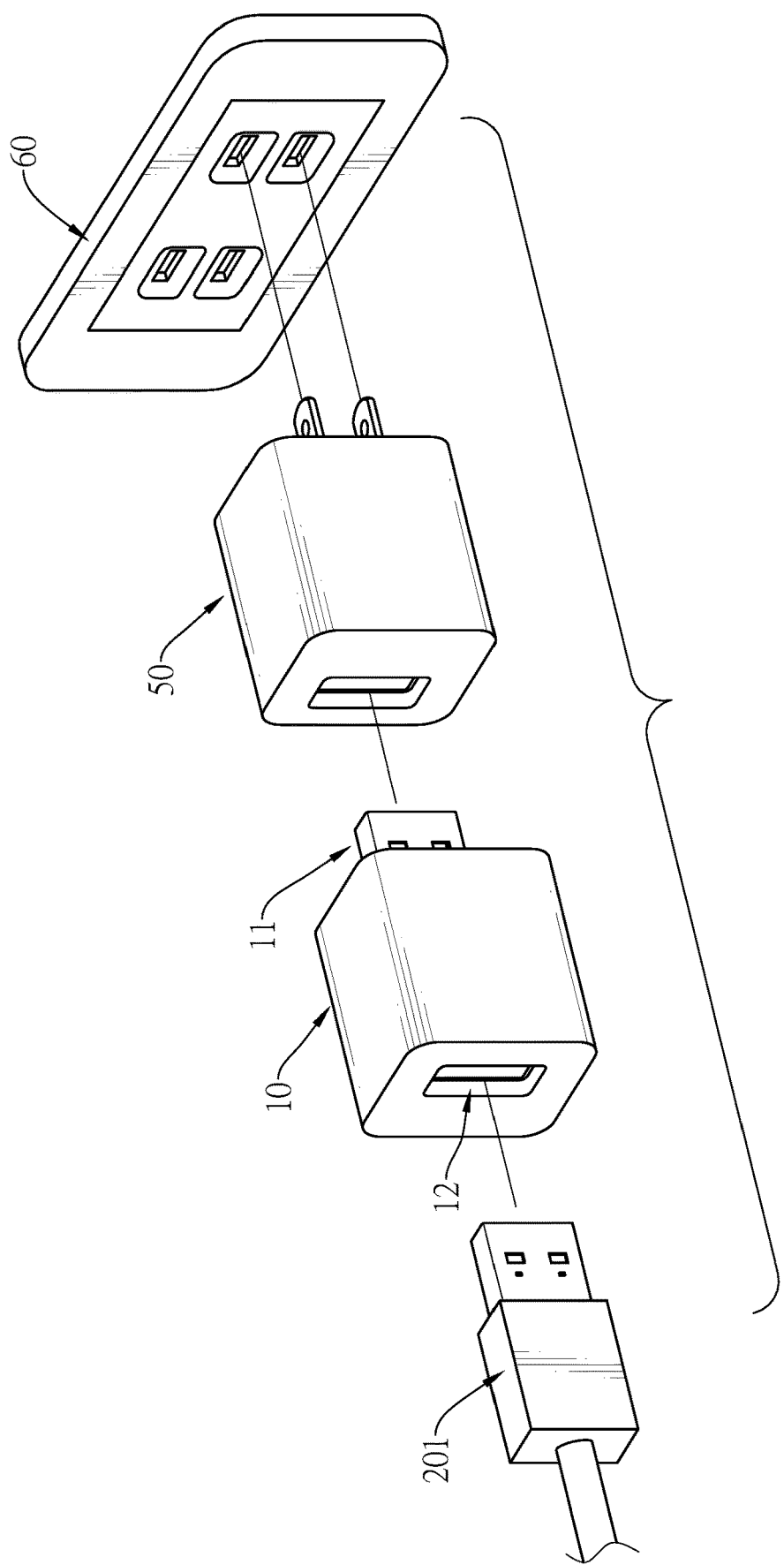
FIG. 3 is a schematic diagram of using the charging apparatus of the present invention.

With reference to FIG. 3, the user of the first electronic device 20 can connect the first electronic device 20 to the charging apparatus 10 through a connecting cable 201, and can further connect to an adaptor 50 of the first electronic device 20 to receive the power source from a main socket 60.

Moreover, the charging apparatus 10 further includes a third connecting interface 16.

The third connecting interface 16 is electrically connected to the first connecting interface 11 for transmitting the power source, and is electrically connected to the processing unit 13. The third connecting interface 16 is adapted to be connected to an external memory device 30.

When the processing unit 13 activates the backup function, the processing unit 13 further backs up the data stored on the first electronic device 20 into the external memory device 30.

Namely, the external memory device 30 connected to the third connecting interface 16 can be an external memory of the charging apparatus 10 for backing up the data stored on the first electronic device 20.

Figure 4:
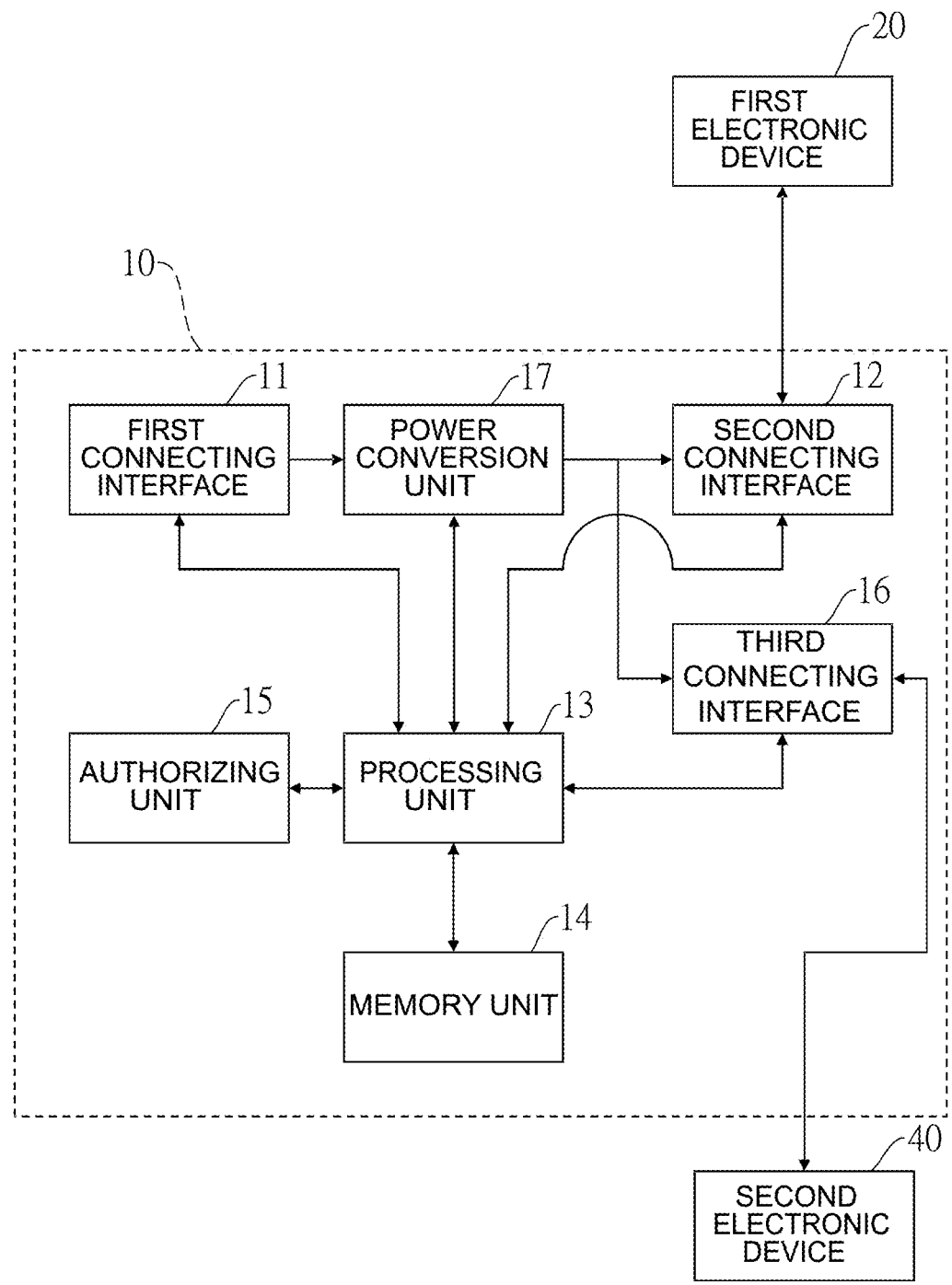
FIG. 4 is a block diagram of another embodiment of the charging apparatus of the present invention.

With reference to FIG. 4, in a second embodiment, the charging apparatus 10 further includes a power conversion unit 17. The second connecting interface 12 is electrically connected to the first connecting interface 11 through the power conversion unit 17. The power conversion unit 17 converts the power source received by the first connecting interface 11 into an output power source, and the second connecting interface 12 outputs the output power source.

In the second embodiment, when the first electronic device 20 is authorized, the processing unit 13 further communicates with the first electronic device 20 for determining an acceptable charging mode.

The power conversion unit 17 is further electrically connected to the processing unit 13, and the processing unit 13 controls the power conversion unit 17 to convert the power source into the output power source according to the acceptable charging mode.

For example, each of the electronic devices has a specific charging mode. When the first electronic device 20 is the smart phone, the acceptable charging mode may follow a power delivery charging protocol such as USB power delivery (PD) charging protocol. When the first electronic device 20 is the laptop, the acceptable charging mode may follow a laptop charging protocol.

Moreover, the third connecting interface 16 may further be adapted to be connected to a second electronic device 40.

The first electronic device 20 is electrically connected to the second connecting interface 12 before the second electronic device 40 is electrically connected to the third connecting interface 16.

When the processing unit 13 activates the backup function, the processing unit 13 firstly backs up the data stored on the first electronic device 20 into the memory unit 14 or restores the data stored on the memory unit 14 into the first electronic device 20, and secondly backs up the data stored on the second electronic device 40 into the memory unit 14 or restores the data stored on the memory unit 14 into the second electronic device 40.

Therefore, the charging apparatus 10 can simultaneously charge the first electronic device 20 and the second electronic device 40. Further, the charging apparatus 10 can alternatively back up the data of the first electronic device 20 and the data of the second electronic device 40.

Figure 5A:
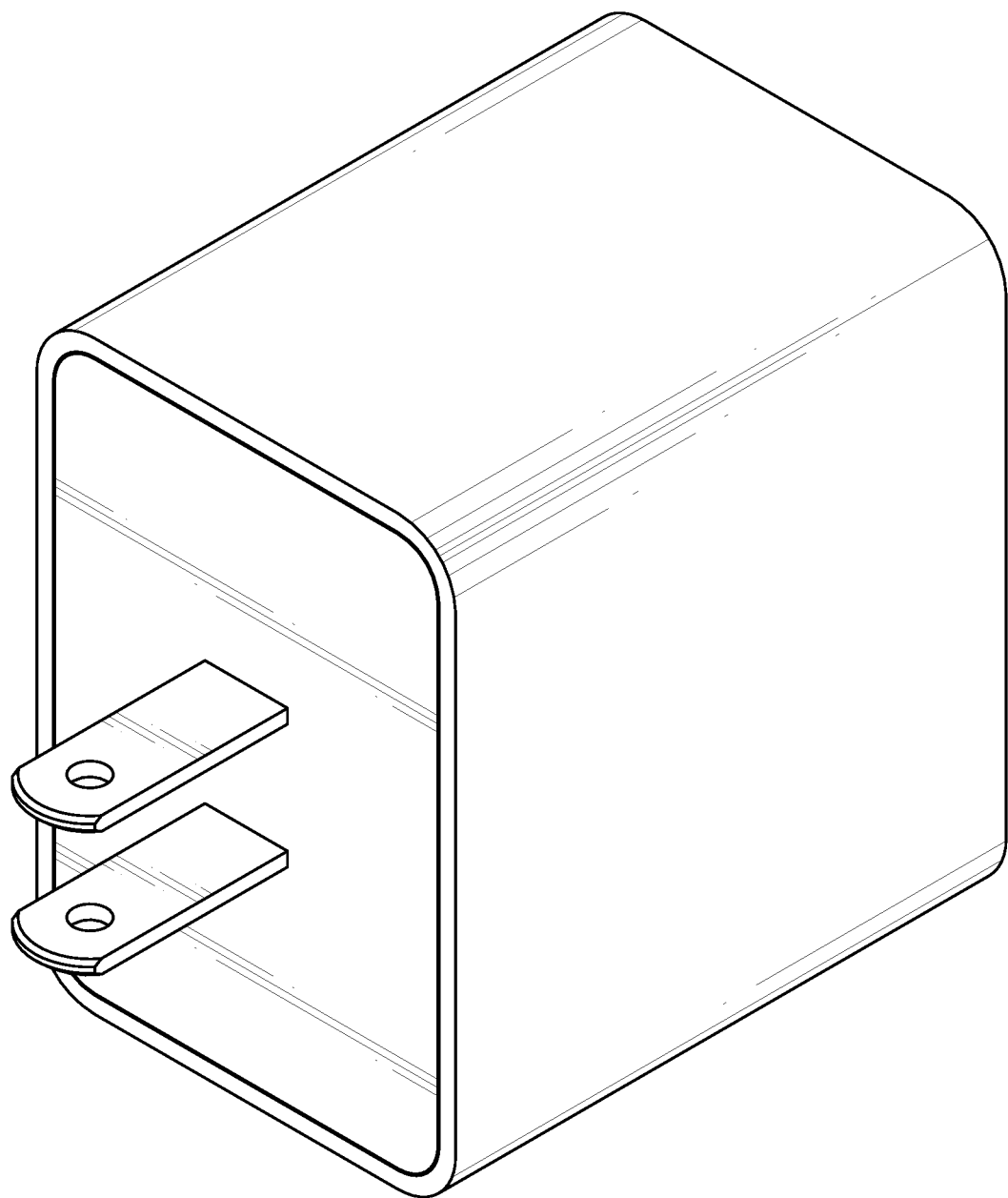
FIGS. 5A and 5B are schematic diagrams of said another embodiment of the charging apparatus of the present invention.
Figure 5B:
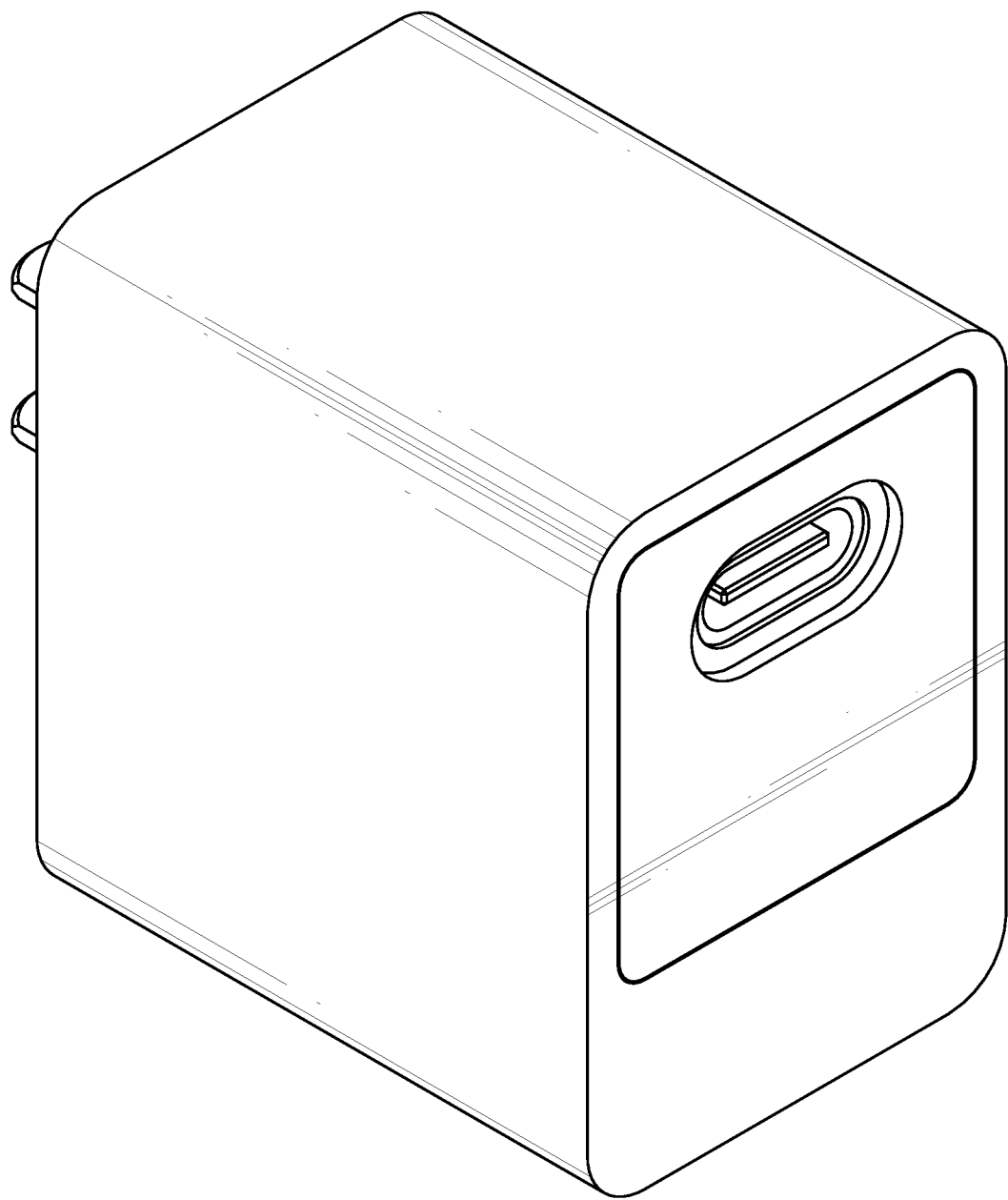
Figure 6I:
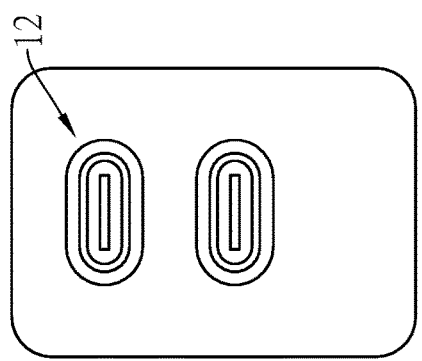
FIGS. 6A-6J are schematic diagrams of a second connecting interface and a third interface of the charging apparatus of the present invention.
Figure 6J:
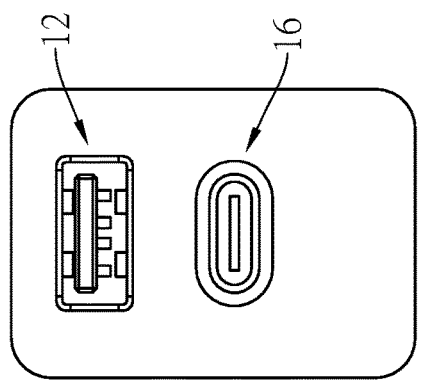
Figure 6G:
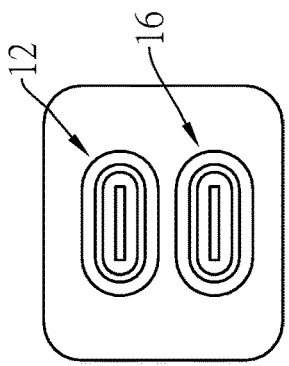
Figure 6H:
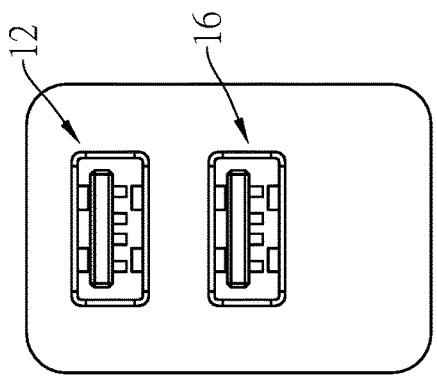
Figure 6D:
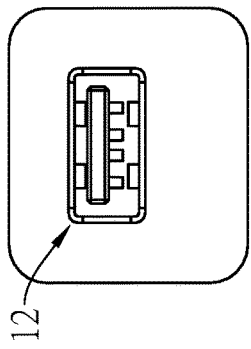
Figure 6E:
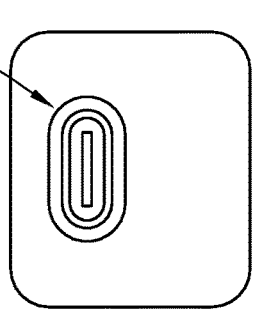
Figure 6F:
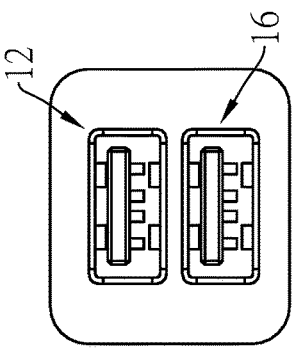
Figure 6A:
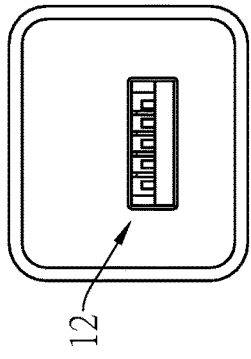
Figure 6B:
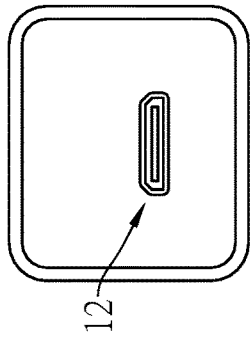
Figure 6C:
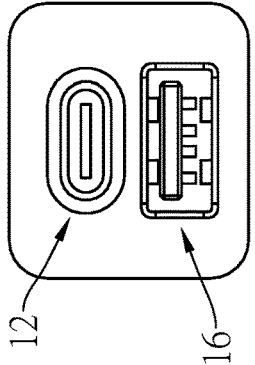

With reference to FIGS. 5A and 5B, in the second embodiment, the first connecting interface 11 may be a pair of conductive prongs for plugging in the mains socket to receive the power source. Namely, the charging apparatus 10 may be the adaptor of the first electronic device 20. The power conversion unit 17 electrically requests more power conversion ability such as AC to DC. The power conversion unit 17 is further electrically connected to the processing unit 13 instead of the first connecting interface 11, and the processing unit 13 controls the power conversion unit 17 to convert the power source into the output power source according to the acceptable charging mode.

With reference to FIGS. 6A-6J, in the first and second embodiments, the second connecting interface 12 may be a female connector such as a female USB Type-A connector, a female USB Type-C connector, or a female lightning connector, etc. The third connecting interface 16 may be a female connector such as a female USB Type-A connector, a female USB Type-C connector, or a female lightning connector, etc.

In the first and second embodiments, when the second connecting interface 12 is connected to the first electronic device 20, the processing unit further presets a host mode to perform an initialization process.

The host mode is preset to initialize the charging apparatus 10, so that the first electronic device 20 can determine statuses and capabilities of the charging apparatus 10 through a specific protocol. For example, the first electronic device 20 can determine whether the charging apparatus 10 has a fast charging protocol, or has a memory unit or not.

Further, when the first electronic device 20 is authorized, the processing unit 13 further switches from the host mode into a device mode, and communicates with the first electronic device 20 according to an external accessory framework.

The device mode presets the charging apparatus 10 to be an accessory of the first electronic device 20, so that the first electronic device 20 can transfer the data into or from the memory unit 14 of the charging apparatus 10, and can receive the output power source for charging.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A charging apparatus having a backup function, comprising:
   a first connecting interface, adapted to receive a power source;
   a second connecting interface, electrically connected to the first connecting interface for transmitting the power source;
   a processing unit, electrically connected to the second connecting interface;

a memory unit, electrically connected to the processing unit;
wherein the processing unit determines whether the second connecting interface is connected to a first electronic device;
wherein when the second connecting interface is connected to the first electronic device, the processing unit activates the backup function to back up data stored on the first electronic device into the memory unit or to restore data stored on the memory unit into the first electronic device, and the first electronic device is simultaneously charged;
a third connecting interface, electrically connected to the first connecting interface for transmitting the power source, and electrically connected to the processing unit;
wherein the third connecting interface is adapted to be connected to an external memory device;
wherein when the processing unit activates the backup function, the processing unit backs up the data stored on the first electronic device into the external memory device through the third connecting interface, or the external memory device through the third connecting interface and the memory unit, or the processing unit restores the data stored on the memory unit or the external memory device into the first electronic device.

2. The charging apparatus as claimed in claim 1, further comprising:
an authorizing unit, electrically connected to the processing unit;
wherein when the second connecting interface is connected to the first electronic device, the processing unit performs an authentication using the authorizing unit to determine whether the first electronic device is authorized, and then when the first electronic device is authorized, the processing unit activates the backup function.

3. The charging apparatus as claimed in claim 1, wherein the first connecting interface is a male connector.

4. The charging apparatus as claimed in claim 3, wherein the male connector is a male USB Type-A connector, a male USB Type-C connector, or a male lightning connector.

5. The charging apparatus as claimed in claim 1, wherein the second connecting interface is a female connector.

6. The charging apparatus as claimed in claim 5, wherein the female connector is a female USB Type-A connector, a female USB Type-C connector, or a female lightning connector.

7. The charging apparatus as claimed in claim 1, wherein the third connecting interface is a female connector.

8. The charging apparatus as claimed in claim 7, wherein the female connector is a female USB Type-A connector, a female USB Type-C connector, or a female lightning connector.

9. The charging apparatus as claimed in claim 1, further comprising:
a power conversion unit; wherein the second connecting interface is electrically connected to the first connecting interface through the power conversion unit;
wherein the power conversion unit converts the power source received by the first connecting interface into an output power source, and the second connecting interface outputs the output power source.

10. The charging apparatus as claimed in claim 9, wherein the first connecting interface is a pair of conductive prongs.

11. The charging apparatus as claimed in claim 9, wherein the second connecting interface is a female connector.

12. The charging apparatus as claimed in claim 11, wherein the female connector is a female USB Type-A connector, a female USB Type-C connector, or a female lightning connector.

13. The charging apparatus as claimed in claim 1, wherein the third connecting interface is a female connector.

14. The charging apparatus as claimed in claim 13, wherein the female connector is a female USB Type-A connector, a female USB Type-C connector, or a female lightning connector.

15. The charging apparatus as claimed in claim 9, wherein when the first electronic device is authorized, the processing unit further communicates with the first electronic device for determining an acceptable charging mode;
wherein the power conversion unit is further electrically connected to the processing unit, and the processing unit controls the power conversion unit to convert the power source into the output power source according to the acceptable charging mode.

16. The charging apparatus as claimed in claim 1, wherein when the second connecting interface is connected to the first electronic device, the processing unit further presets a host mode to perform an initialization process.

17. The charging apparatus as claimed in claim 16, wherein when the first electronic device is authorized, the processing unit further switches from the host mode into a device mode, and communicates with the first electronic device according to an external accessory framework.

18. The charging apparatus as claimed in claim 1, wherein the third connecting interface is further adapted to be connected to a second electronic device;
wherein the first electronic device is electrically connected to the second connecting interface before the second electronic device is electrically connected to the third connecting interface;
wherein when the processing unit activates the backup function, the processing unit firstly backs up the data stored on the first electronic device into the memory unit or restores the data stored on the memory unit into the first electronic device, and secondly backs up the data stored on the second electronic device into the memory unit or restores the data stored on the memory unit into the second electronic device.

* * * * *